J. F. THOMPSON.
CAR WHEEL FENDER.
APPLICATION FILED JULY 11, 1921.
1,397,825.
Patented Nov. 22, 1921.
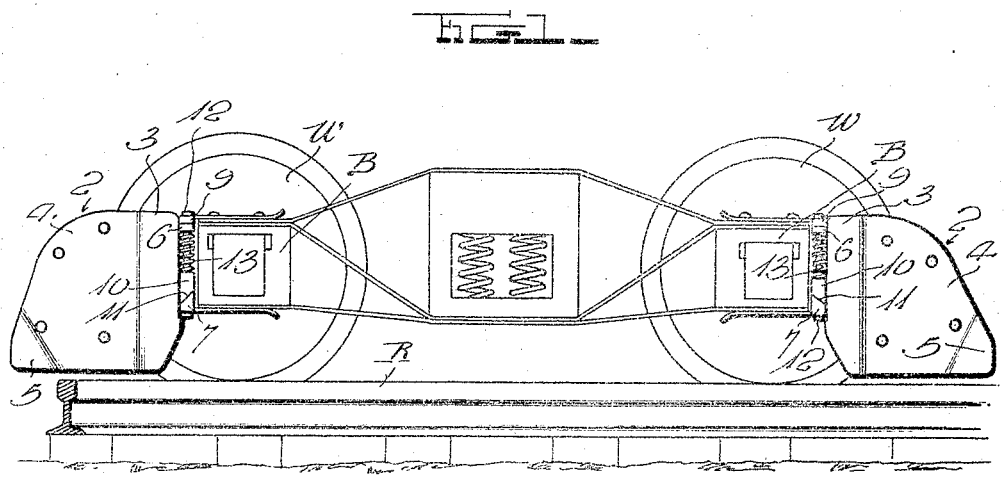
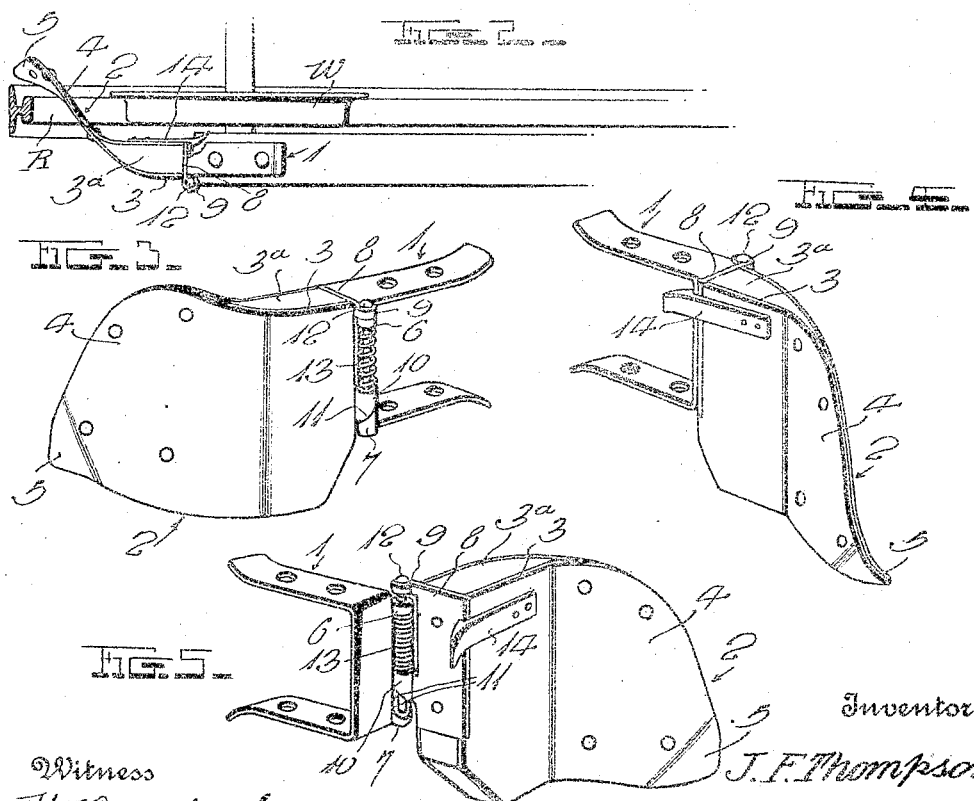

UNITED STATES PATENT OFFICE.

JOSEPH F. THOMPSON, OF MARIETTA, OHIO.

CAR-WHEEL FENDER.

1,397,825. Specification of Letters Patent. Patented Nov. 22, 1921.

Application filed July 11, 1921. Serial No. 483,929.

*To all whom it may concern:*

Be it known that I, JOSEPH F. THOMPSON, a citizen of the United States, residing at Marietta, in the county of Washington and State of Ohio, have invented certain new and useful Improvements in Car-Wheel Fenders; and I do declare the following to be a full, clear, and exact description of the invention, such as will enable others skilled in the art to which it appertains to make and use the same.

This invention relates to an improved fender which is especially designed for use in connection with car wheels, the same being disposed in close proximity to the track and having a portion extended crosswise of the latter and a portion extending in parallelism with one side of the wheel with which it co-acts, the fender itself being so shaped that when it strikes an obstruction, it will lift the same and carry it rearwardly outward out of the path of the wheels, journal boxes and other parts of the car. Thus, in case persons or animals are caught on the track, the improved fender will serve to move them out of the path of the car and in many instances without severely injuring them.

Another and important feature of the invention is to provide a safety device of this class wherein the fender is pivotally mounted and is capable of being swung alongside of the wheel so that it can be positioned in an out-of-the-way place to permit effective use of a wheel gage without necessitating removal of the wheel fender and without interfering with free use of the aforesaid gage.

Another object of the invention is to provide a device of this class wherein when the fender is swung to the position above mentioned, it will be slightly elevated and will clear the track sufficiently far to permit free access to be had to the wheel for gaging purposes and the like.

A still further object of the invention is to provide a safety device for use in connection with car wheels which is such in construction that the fender is automatically returned to operative position and the spring which serves to accomplish this, is unanchored, permitting it and the pivot pin to be conveniently removed from the bearings through which the pivot pin extends.

Other objects and advantages of the invention will be apparent during the course of the following description.

In the accompanying drawings forming a part of this specification and in which like numerals are employed to designate like parts throughout the same:

Figure 1 is an elevational view of the truck of a railway car equipped with safety devices constructed in accordance with this invention.

Fig. 2 is a top plan view of one of the devices shown in use.

Fig. 3 is a perspective view of one side of the device.

Fig. 4 is a similar view of the opposite side of the device.

Fig. 5 is a view similar to Fig. 4 showing the catch disengaged and the fender swung on its pivot and away from the attaching bracket.

Referring to the drawings, W designates a pair of flanged car wheels and B designates the journal boxes which are associated therewith, while R designates the rail. Here, it may be stated that each individual wheel is designed to be equipped with its own fender or guard.

Referring to the parts of the guard by numerals, 1 designates a substantially U-shaped attaching bracket which is designed to be bolted or otherwise secured to the journal box. Before proceeding further, I wish to state that although I have shown two guards in use in Fig. 1, for the sake of clearness, I will confine the description to singular terms, it being understood that where such terms appear they refer to all duplicate parts appearing on the drawing. Proceeding, it is to be pointed out that a fender 2 is pivotally connected with this bracket 1 by novel means to be hereinafter described and while this fender may be constructed otherwise, it is preferably formed from two plates which are riveted or otherwise secured together at their forward ends and are spaced apart at their rear ends to permit reinforcing and filler block 3ª of wedge-shape to be positioned between them to render the fender extremely rigid. As before indicated, the fender is so shaped that when it comes into engagement with an object in its path, it serves to lift that object, carry it outwardly and rearwardly and deposit it along the side of the track so that it will be out of the path of the wheels and all projecting parts of the car truck. In carrying out this feature of the invention it will be seen that the plates forming the fender are disposed in parallelism and spaced slightly away from the wheel as indicated at 3, whereas the portions designated by the numeral 4 are curved inwardly so as to extend in front of the tread of the wheel and thereby become disposed cross-wise of the rails. It is to be noted that the curved portion 4 of the fender has its free edge inclined downwardly as shown and its lower corner 5 curved laterally as indicated. Hence, when this portion 5 of the fender comes into engagement with an object, it serves first to lift said object upwardly and lay it against the broad curved surface 4 of the fender. During the travel of the car, the object is then carried rearwardly over this curved surface and over the portion 3 and in this way deposited alongside of the track where it will be out of the path of the wheels and any projecting part of the underframe of the car. As before pointed out, this particular shaping of the fender will be found extremely advantageous in cases where persons or animals are caught by the fender, as it will practically permit them to escape severe injury by being caught and thrown to a point of safety.

It has been before indicated that the fender is pivotally connected with the attaching bracket. To this end, the bracket is equipped with upper and lower integral bearings 6 and 7 while the fender is equipped with a plate 8 carrying upper and lower bearings 9 and 10 for coöperation with the first-named bearings. Attention is here directed to the fact that the abutting edges of the lower bearings 7 and 10 are cut as shown at 11 to provide co-acting cam surfaces. A removable pintle 12 is passed through these bearings and thus serves to connect the fender to the attaching bracket. It is yet to be pointed out that a coiled spring 11 loosely surrounds the pintle between the bearings 6 and 10. In order to permit quick separation of the bracket and fender and removal of the pintle, the ends of the coiled spring 13 are not anchored. However, this spring will serve to automatically swing and maintain the fender in operative position because of the action of the cam co-acting surfaces 11 on the aforesaid lower bearing. By examining the showing in Fig. 5, it will be seen how this is accomplished. In this figure the fender has been partially swung away from the track and to a position at approximate right angles thereto, this being done to permit access to be had to the forward portion of the wheel for conveniently using a gage or other tool. In moving the fender in this manner, the cam surfaces of the lower bearings raise the fender slightly and in so doing compresses the coiled spring 13 and it is the tendency of this spring as soon as the fender is released to automatically swing the fender to its normal operative position. This leads me to say that it is desirable to maintain the fender in this last named position and to accomplish it I make use of a resilient latch 14 which I rigidly secure to the inner face of one of the plates of the fender so that the nose of this latch will automatically engage the intermediate connecting portion of the attaching bracket as shown in Fig. 4.

Assuming that the fenders are in the positions indicated in Fig. 1, it will be seen that as the car is in motion and in case an obstruction is lying on or close to the track, when the fender engages it, the curved corner 5 will serve to lift said object upwardly and dispose it against the relatively wide curved portion 4 of the fender. The continued motion of the car will cause the object to ride rearwardly and onto the portion 3 of the fender, after which, the object may be deposited alongside the track at a point of safety. In case it is desired to obtain access to that portion of the wheel covered by the fender, the latter can be swung on its pivot by first disengaging the latch 14 and moving it away from the wheel. As before indicated, when the fender is so moved, it causes the spring 13 to compress owing to the action of the cam co-acting surfaces 11 on the lower bearings 7 and 10, this result being brought about as the bearing 10 approaches the bearing 6. As soon, however, as the fender is released, the spring tends to resume its normal state and causes the cam surface on one bearing to ride on the corresponding surface of the bearing which it co-acts, in this way permitting the unanchored spring to automatically swing the fender to its operative position. Emphasis is to be laid on this construction in view of the fact that it permits the pintle to be easily removed so as to permit the fender to be disconnected from the attaching bracket for any desired reason.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the subjoined claims may be resorted to if desired.

I claim:

1. A wheel fender comprising an attaching bracket and a fender pivotally connected therewith, including a portion extending alongside the wheel and a portion directed in front of the wheel tread and extending across the track, the lower edge of the fender being disposed in close proximity to the track, and co-acting means between the bracket and fender for automatically lifting the latter when it is swung to inoperative position, whereby it will clear the track sufficiently far to enable free access to the wheel to be had.

2. A wheel fender comprising a U-shaped attaching bracket including laterally disposed bearings, a fender likewise provided with bearings for co-action with the first named bearings, cam co-acting means between one of the bearings on the fender and on the bracket, a pivot pin passing through said bearings, and a coiled spring surrounding the pin between the bearings.

In testimony whereof I have hereunto set my hand.

JOSEPH F. THOMPSON.